(12) United States Patent
Liu et al.

(10) Patent No.: US 9,348,957 B1
(45) Date of Patent: May 24, 2016

(54) REPETITIVE CIRCUIT SIMULATION

(75) Inventors: Zhihong Liu, Cupertino, CA (US); Bruce W. McGaughy, Fremont, CA (US)

(73) Assignee: PROPLUS DESIGN SOLUTIONS, INC., San Jose, CA (US)

( * ) Notice: Subject to any disclaimer, the term of this patent is extended or adjusted under 35 U.S.C. 154(b) by 320 days.

(21) Appl. No.: 13/250,541

(22) Filed: Sep. 30, 2011

Related U.S. Application Data

(60) Provisional application No. 61/389,041, filed on Oct. 1, 2010.

(51) Int. Cl.
*G06F 17/50* (2006.01)
*G01R 31/3185* (2006.01)

(52) U.S. Cl.
CPC .... *G06F 17/5036* (2013.01); *G01R 31/318583* (2013.01)

(58) Field of Classification Search
CPC ............ G06F 17/5036; G06F 17/5022; G06F 17/5009; G01R 31/318533; G01R 31/31704; G01R 31/318357; G05B 17/02
See application file for complete search history.

(56) References Cited

U.S. PATENT DOCUMENTS

| | | | | |
|---|---|---|---|---|
| 5,553,002 | A * | 9/1996 | Dangelo | G01R 31/31704 714/E11.167 |
| 6,807,520 | B1 * | 10/2004 | Zhou et al. | 703/14 |
| 7,822,590 | B2 * | 10/2010 | Kundert | G01R 31/318357 345/581 |
| 8,195,439 | B1 * | 6/2012 | Hussain | 703/14 |
| 8,260,600 | B1 * | 9/2012 | Deng et al. | 703/14 |
| 8,428,928 | B1 * | 4/2013 | McGaughy | 703/14 |
| 9,031,825 | B1 * | 5/2015 | McGaughy | G06F 17/5022 703/14 |
| 2002/0156609 | A1 * | 10/2002 | Hirata et al. | 703/14 |
| 2006/0248518 | A1 * | 11/2006 | Kundert | G06F 17/5036 717/140 |
| 2008/0059922 | A1 * | 3/2008 | Korobkov | G06F 17/5036 716/102 |
| 2008/0195359 | A1 * | 8/2008 | Barker | G05B 17/02 703/2 |
| 2009/0276191 | A1 * | 11/2009 | Bell et al. | 703/1 |
| 2010/0017186 | A1 * | 1/2010 | Kim | G06F 17/5036 703/14 |
| 2010/0049495 | A1 * | 2/2010 | Francken et al. | 703/14 |
| 2010/0102825 | A1 * | 4/2010 | Bushnell | G01R 31/318583 324/537 |
| 2010/0250187 | A1 * | 9/2010 | Zuber | G06F 17/5036 702/179 |
| 2011/0035203 | A1 * | 2/2011 | Dalton | G06F 17/5009 703/14 |
| 2011/0040548 | A1 * | 2/2011 | Khalily | G06F 17/5036 703/14 |
| 2011/0172979 | A1 * | 7/2011 | Bansal | G06F 17/5022 703/4 |
| 2011/0313738 | A1 * | 12/2011 | Stamoulis | G06F 17/5036 703/2 |

OTHER PUBLICATIONS

CPU cache, http://en.wikipedia.org/wiki/CPU_cache, Wikipedia, 2008.*

(Continued)

*Primary Examiner* — Kandasamy Thangavelu
(74) *Attorney, Agent, or Firm* — Silicon Valley Patent Group LLP; Thomas C. Chan

(57) ABSTRACT

Method and system are disclosed for repetitive circuit simulation. In one embodiment, a computer implemented method for performing multiple simulations of a circuit includes providing descriptions of connectivity, instants, signal activities, and statistical parameters of the circuit, parsing the circuit in accordance with the descriptions of connectivity, instants, signal activities, and statistical parameters of the circuit to form one or more circuit partitions, performing a first pass simulation of the one or more circuit partitions in accordance with a set of stimuli to generate a history of the first pass simulation, and performing subsequent simulation of the one or more circuit partitions using the history of the first pass simulation.

17 Claims, 5 Drawing Sheets

(56) References Cited

OTHER PUBLICATIONS

IBM, Feedback optimization of Process Simulation, IP.com Prior Art Database, Jun. 22, 2006.*

J. Chen et al., "E-T Based Statistical Modeling and Compact Statistical Circuit Simulation Methodologies," 1996 Proc. of IEDM, pp. 635-638.*

Orshansky et al., A Statistical Performance Simulation Methodology of VLSI Circuits, 1998.*

* cited by examiner

REPETITIVE CIRCUIT SIMULATION

CROSS REFERENCE TO RELATED APPLICATIONS

This application claims the benefit of U.S. provisional application No. 61/389,041, "Repetitive Circuit Simulation" filed Oct. 1, 2010. The aforementioned United States application is hereby incorporated by reference in its entirety.

FIELD

The present disclosure relates to the field of electronic design automation tools. In particular, the present disclosure relates to methods and systems for conducting repetitive circuit simulation.

BACKGROUND

An integrated circuit is a network of circuit elements such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

The development of complicated integrated circuits often requires the use of powerful numerical simulation programs. For example, circuit simulation is an essential part in the design flow of integrated circuits, helping circuit designers to verify the functionality and performance of their designs without going through expensive fabrication processes. As the semiconductor processing technology migrates to nanometer dimensions, new simulation methodologies are needed to solve the new problems intrinsically existing in circuit design with nanometer features. Modern integrated circuits continually challenge circuit simulation algorithms and implementations in the development of new technology generations. The semiconductor industry requires EDA software with the ability to analyze nanometer effects like coupling noise, ground bounce, transmission line wave propagation, dynamic leakage current, supply voltage drop, and nonlinear device and circuit behavior, which are all related to dynamic current. Thus, detailed circuit simulation and transistor-level simulation have become one of the most effective ways to investigate and resolve issues with nanometer designs.

Examples of electronic circuit simulators include the Simulation Program with Integrated Circuit Emphasis (SPICE) developed at the University of California, Berkeley (UC Berkeley), and various enhanced versions or derivatives of SPICE. SPICE and its derivatives or enhanced versions will be referred to hereafter as SPICE circuit simulators, or SPICE. The SPICE method considers a circuit as a non-divided object.

SPICE-like simulations may provide fairly accurate predictions of how corresponding circuits will behave when actually built. The predictions are preferably made not only for individual sub-circuit but also for whole systems (e.g., whole integrated circuits) so that system-wide problems relating to noise and the like may be uncovered and dealt with. In a general process flow of a SPICE-like simulation, an analog integrated circuit under simulation is often represented in the form of a netlist description. A netlist is a circuit description of the analog circuit to be simulated written in a SPICE-like language. SPICE netlists are pure structural languages with simulation control statements. Other language like Verilog-A™ has the capability to include behavioral constructs. The structural netlist of SPICE together with a predefined set of circuit components of the analog integrated circuit may be represented in the form of a matrix in accordance with certain circuit modeling methodologies (which is not a concern of the present disclosure). The number of nonlinear differential equations ranges from 1 to n. There are a corresponding number of input vectors to be operated by the linear equation. The set of input vectors are shown as $\{I_1, I_2, \ldots V_n\}$. Next, the linear matrix is computed with the set of input vectors to generate a set of solution vectors $\{V_1, V_2, \ldots V_n\}$. The computation is repeated until the set of solutions converge. The set of solutions may be then displayed in the form of waveforms, measurements, or checks on a computer screen for engineers to inspect the simulation results.

However, SPICE-like simulation of a whole system becomes more difficult and problematic as the industry continues its relentless trek of scaling down to smaller and smaller device geometries and of cramming more interconnected components into the system. An example of such down scaling is the recent shift from micron-sized channels toward deep submicron sized transistor channel lengths. Because of the smaller device geometries, a circuit designer are able to cram exponentially larger numbers of circuit components (e.g., transistors, diodes, capacitors) into a given integrated circuit (IC), and therefore increases the matrix size to a complexity which may not be solved in a desired time frame.

A circuit may be represented as a large numerically discrete nonlinear matrix for analyzing instant current. The matrix dimension is of the same order as the number of the nodes in the circuit. For transient analysis, this giant nonlinear system needs to solve hundreds of thousand times, thus restricting the capacity and performance of the SPICE method. The SPICE method in general can simulate a circuit up to about 50,000 nodes. Therefore it is not practical to use the SPICE method in full chip design. It is widely used in cell design, library building, and accuracy verification.

With some accuracy lost, the Fast SPICE method developed in the early 1990s provides capacity and speed about two orders of magnitude greater than the SPICE method. The performance gain was made by employing simplified models, circuit partition methods, and event-driven algorithms, and by taking advantage of circuit latency.

SPICE models a circuit in a node/element fashion, i.e., the circuit is regarded as a collection of various circuit elements connected at nodes. At the heart of SPICE is the so-called Nodal Analysis, which is accomplished by formulating nodal equations (or circuit equations) in matrix format to represent the circuit and by solving these nodal equations. The circuit elements are modeled by device models, which produce model results that are represented in the circuit equations as matrices.

A device model for modeling a circuit element, such as the SPICE model for modeling MOSFET devices, developed by UC Berkeley, typically includes model equations and a set of model parameters that mathematically represent characteristics of the circuit element under various bias conditions. For example, a circuit element with n terminals can be modeled by the following current-voltage relations:

$$I_i = f_i(V_1, \ldots, V_n, t) \text{ for } i=1, \ldots n,$$

where $I_i$ represents the current entering terminal I; $V_j$ (j=1, ..., n) represents the voltage or terminal bias across terminal j and a reference terminal, such as the ground; and t represents the time. The Kirchhoff's Current Law implies that the current entering terminal n is given by $$I_n = \sum_{i=1}^{n-1} I_i,$$

A conductance matrix of the circuit element is defined by:

$$G(V_1, \ldots, V_n, t) := \begin{pmatrix} \frac{\partial f_1}{\partial V_1} & \cdots & \frac{\partial f_1}{\partial V_n} \\ \vdots & \ddots & \vdots \\ \frac{\partial f_n}{\partial V_1} & \cdots & \frac{\partial f_n}{\partial V_n} \end{pmatrix}.$$

To model the circuit element under alternating current (AC) operations, the device model also considers the relationship between node charges and the terminal biases:

$$Q_i = q_i(V_1, \ldots, V_n, t) \text{ for } i = 1, \ldots, n.$$

where $Q_i$ represents the node charge at terminal i. Thus, the capacitance matrix of the n-terminal circuit element is defined by $$C(V_1, \ldots, V_n, t) := \begin{pmatrix} \frac{\partial q_1}{\partial V_1} & \cdots & \frac{\partial q_1}{\partial V_n} \\ \vdots & \ddots & \vdots \\ \frac{\partial q_n}{\partial V_1} & \cdots & \frac{\partial q_n}{\partial V_n} \end{pmatrix}.$$

Solving a matrix can be very time consuming when the matrix size become very large for a nanometer design, as the computational cost is in the order of $n^3$, where n is the size of the matrix. During circuit simulation, the total simulation time T is proximately equal to $$T \approx \Sigma \text{Timestep}_i \times \text{Time}_{solve}^i$$

Where, Timestep$_i$ is the length of each time step, Time$_{solve}^i$ is solve time spent on time step i. In general the smaller the time steps, the more accurate the simulation. However, unnecessary small time steps can slow down the simulation, while a larger time step can lead to slower convergence as more iteration has to be taken to reach a converged solution. In practice, the time step has to be optimized to trade off between accuracy and total simulation time. When circuit simulation is used for statistical analysis, it can increase the total simulation time to be the product of total number of seeds and the corresponding simulation time spent on each seed. For a typical Monte-Carlo analysis, it can take more than a thousand simulations (seeds) to reach a converged solution.

To improve the performance of circuit simulation, conventional systems may employ multiple computers working together in solving a large complicated matrix, with each computer scheduled to process certain tasks of the simulation. These multiple computers, also referred to collectively as a server farm, may be placed in different geographical locations, and they are typically connected through a computer network. However, one of the drawbacks of the conventional systems is the synchronization and network data communication required between the computers, which have significantly compromised the benefits gained by processing multiple tasks in parallel. In addition, the conventional systems are very expensive because multiple computers are being used.

Therefore, there is a need for methods and systems that address the issues of the conventional simulation systems described above. Specifically, there is a need for methods and systems for conducting repetitive circuit simulation.

SUMMARY

Method and system are disclosed for repetitive circuit simulation. In one embodiment, a computer implemented method for performing multiple simulations of a circuit includes providing descriptions of connectivity, instants, signal activities, and statistical parameters of the circuit, parsing the circuit in accordance with the descriptions of connectivity, instants, signal activities, and statistical parameters of the circuit to form one or more circuit partitions, performing a first pass simulation of the one or more circuit partitions in accordance with a set of stimuli to generate a history of the first pass simulation, and performing subsequent simulation of the one or more circuit partitions using the history of the first pass simulation. The history of the first pass simulation is stored in cache memory of one or more processors, where the history of the first pass simulation includes the descriptions of connectivity, instants, signal activities, and statistical parameters, and corresponding simulation outputs of the circuit during a period of the first pass simulation.

In another embodiment, the above computer implemented method further includes selecting simulation time steps based on information of the statistical parameters and the history of the first pass simulation, and simulating the circuit using the one or more circuit partitions and the simulation time steps.

In yet another embodiment, the above computer implemented method further includes identifying correlations between the statistical parameters and simulation output of the circuit, and performing subsequent simulation of the one or more circuit partitions using the correlations between the statistical parameters and simulation output of the circuit.

In yet another embodiment, the above computer implemented method further includes generating seeds of simulation that includes random combinations of values of the statistical parameters, sorting the seeds of simulation according to predetermined order of changes of one or more statistical parameters, simulating the circuit using the one or more circuit partitions and sorted seeds of the simulation, detecting substantial deviations of simulation outputs using the predetermined order of changes of one or more statistical parameters, and adapting simulation to the substantial deviations of simulation output.

In yet another embodiment, the above computer implemented method further includes modifying a subset of instances of the circuit, stamping circuit matrices associated with changes due to the subset of instances, and simulating the circuit using the one or more circuit partitions and the history of the first pass simulation. In addition, the computer implemented method further includes modifying one or more statistical parameters of an instance of the circuit, simulating the circuit using the one or more circuit partitions and the history of the first pass simulation.

BRIEF DESCRIPTION OF THE DRAWINGS

The aforementioned features and advantages of the disclosure, as well as additional features and advantages thereof, will be more clearly understandable after reading detailed descriptions of embodiments in conjunction with the following drawings.

Like numbers are used throughout the figures.

DESCRIPTION OF EMBODIMENTS

Methods and systems are provided for conducting repetitive circuit simulation. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
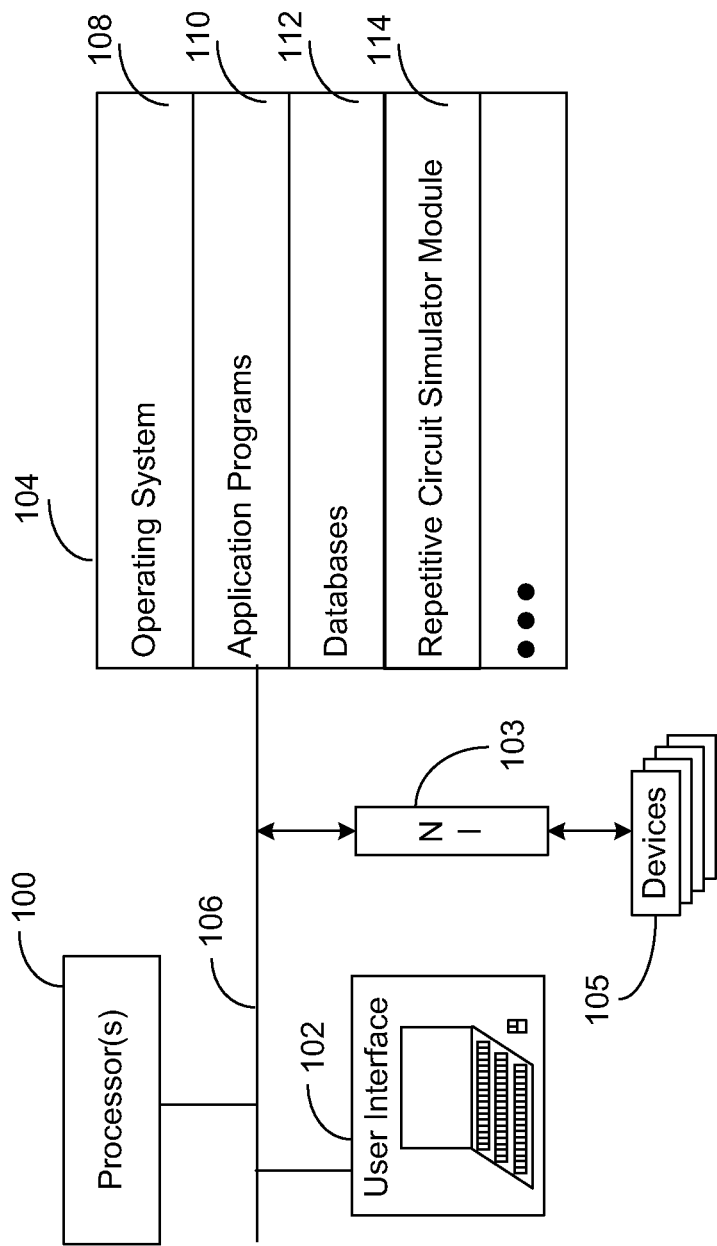
FIG. 1 illustrates a system for implementing methods of repetitive circuit simulation according to an embodiment of the present disclosure.

FIG. 1 illustrates a system for implementing methods of repetitive circuit simulation according to an embodiment of the present disclosure. In one embodiment, the methods for conducting repetitive circuit simulation may be implemented using a computer system. The computer system may include one or more graphics processing units (GPUs) and/or central processing units (CPUs) 100 (hereinafter referred to as processor(s) for short), at least a user interface 102 for displaying computation results and waveforms, a memory device 104, a system bus 106, and one or more bus interfaces for connecting the GPUs/CPUs, user interface, memory device, and system bus together. The computer system also includes at least one network interface 103 for communicating with other devices 105 on a computer network. In alternative embodiments, certain functionalities of the method and system may be implemented in one or more application-specific integrated circuits (ASICs) or field-programmable gate arrays (FPGAs), thereby reducing the role of the GPU/CPU.

The memory device 104 may include high-speed random-access memory and may also include non-volatile memory, such as one or more magnetic disk storage devices. The memory device may also include mass storage that is located remotely from the GPUs/CPUs. The memory device preferably stores:

- an operating system 108 that includes procedures for handling various basic system services and for performing hardware-dependent tasks;
- application programs 110 for performing other user-defined applications and tasks, such as circuit simulations and device evaluations;
- databases 112 for storing information of the integrated circuit, the databases include data structures, device models, and matrices;
- repetitive circuit simulator module 114 configured to use information collected from a prior simulation for subsequent circuit simulations.

The databases, the application programs, and the program for implementing methods of repetitive circuit simulation may include executable procedures, sub-modules, tables, and other data structures. In other embodiments, additional or different modules and data structures may be used, and some of the modules and/or data structures listed above may not be used.

Figure 2:
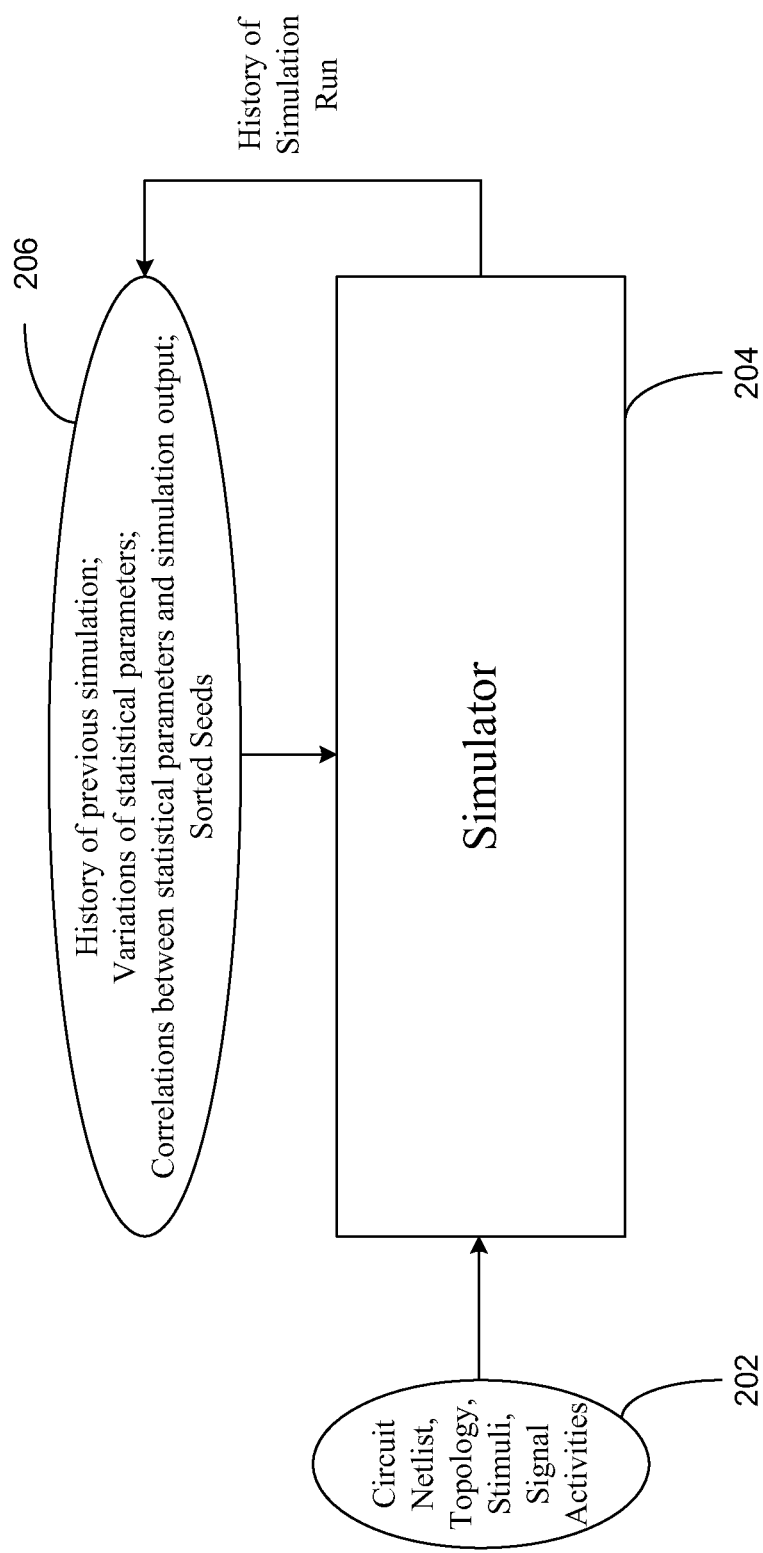
FIG. 2 illustrates an overview of methods for conducting repetitive circuit simulation according to embodiments of the present disclosure.

FIG. 2 illustrates an overview of methods for conducting repetitive circuit simulation according to embodiments of the present disclosure. In the example shown in FIG. 2, inputs 202 to a circuit simulator 204 include circuit netlist, which consists of descriptions of connectivity, instances and topologies of the circuit under simulation. The inputs 202 also include stimuli to the circuit as well as characteristics of signal activities. Additional inputs 206 to the simulator 204 includes histories of previous simulation, variations of statistical parameters, correlations between statistical parameters and simulation output, and sorted seeds for the simulation. A history of a previous simulation may be captured by the simulator 204 and used for the subsequent simulations. Note that there are two types of statistical parameters. One type is the model parameter such as threshold voltage of a transistor model, etc. The second type is instant parameter such as channel width and length, temperature, supply voltage, etc. For simplicity, these two types of parameters are commonly referred to as statistical parameters in this disclosure.

According to embodiments of the present disclosure, the history of a previous simulation 206 may be captured for a period of time, and the period of time can be a single time step, multiple time steps, or an entire simulation time window. For example, the method may simulation a first circuit partition for one time step; and the simulation of all other circuit partitions can learn from the history of simulating the first circuit partition on the fly. In this manner, the storage overhead of the simulation can be reduced, because the information required for simulating the subsequent circuit partitions can be reused as they may still be in the memory. It follows that the simulation history of multiple time steps or the entire simulation time window of a first circuit partition may be stored for reuse for simulating subsequent circuit partitions.

Figure 3:
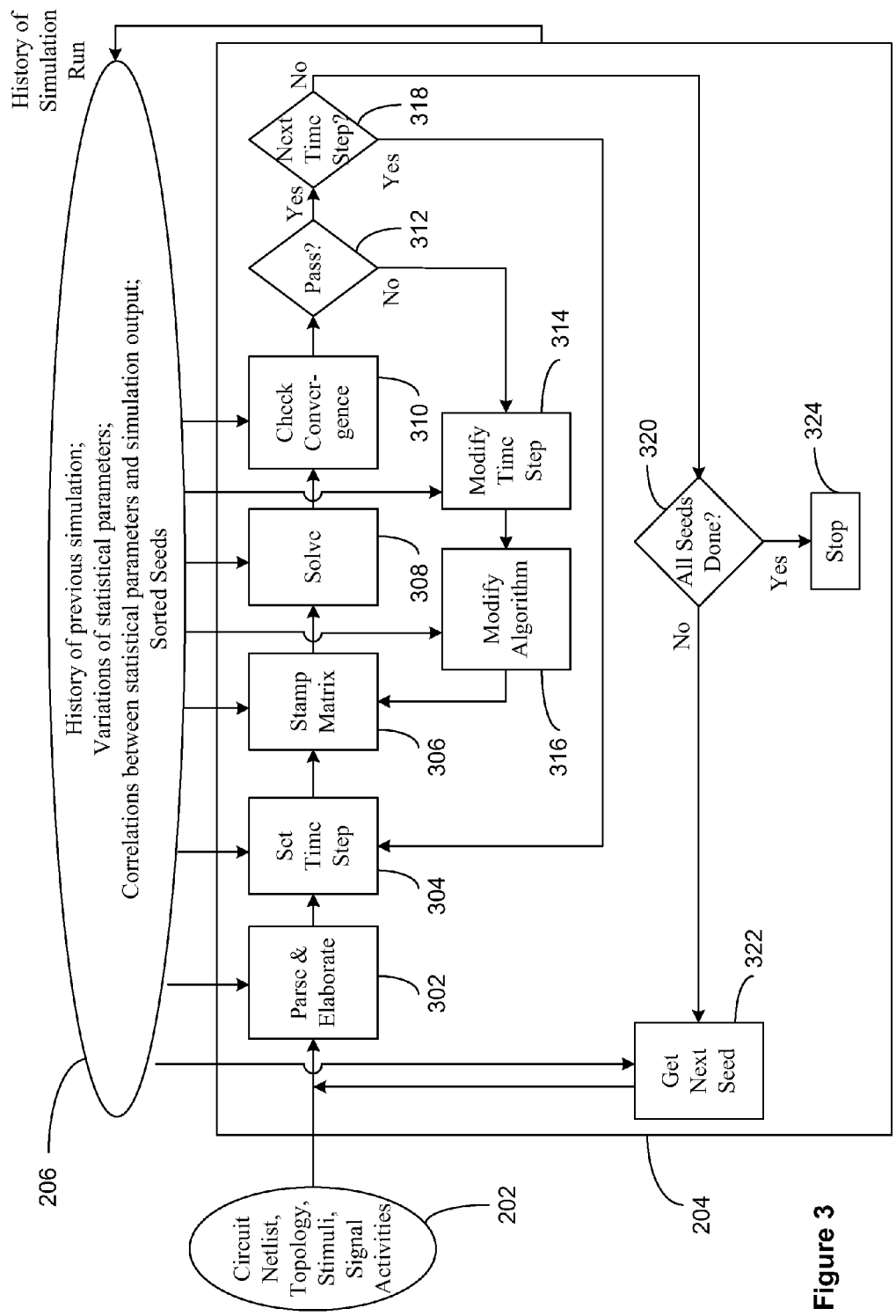
FIG. 3 illustrates an exemplary block diagram for conducting methods of repetitive circuit simulation according to embodiments of the present disclosure.

FIG. 3 illustrates an exemplary block diagram for conducting methods of repetitive circuit simulation according to embodiments of the present disclosure. An exemplary simulation flow performed by the simulator 204 and key blocks of the simulator are shown in FIG. 3. For example, some of the key blocks include parse and elaborate 302, set time step 304, stamp matrix 306, solve 308, check convergence 310. In block 312, a first determination is made as to whether the simulation is passed. If the simulation is not passed (312_No), the method moves to block 314 where the time step is modified; follow by block 316 where the algorithm may be modified. After block 316, blocks 306, 308, 310, and 312 are repeated. If the simulation is passed (312_Yes), the method moves to block 318 where a second determination is made as to whether there is a next time step. If there is a next time step (318_Yes), the method moves to block 304 to set time step, and repeats the blocks after 304. If there is no next time step (318_No), the method moves to block 320. At block 320, a third determination is made as to whether all simulation seeds are done. If there are more seeds to simulate (320_No), the method moves to block 322 to get next seed. After block 322, the method repeats the flow chart from block 302 to block 320. If all simulation seeds are done (320_Yes), the method ends in block 324.

Note that arrows in FIG. 3 indicate communications between the inputs and the key blocks of the simulator. In the following sections of the disclosure, applications of using history of previous simulation, variations of statistical parameters, correlations between statistical parameters and simulation output, and sorted seeds with the key blocks of the simulator are further described.

According to embodiments of the present disclosure, the solver (represented by block 308) may be configured to take into account the nature of the circuit analyses. In typical multi-pass simulation of complex integrated circuits, only a limited number of circuit variables are changed while the topology and stimuli of the circuit remain substantially the same. In such cases, the circuit matrix structure do not change for each seed, as the circuit matrix structure is determined by the circuit topology and stimuli, and it is not affected by the variations of statistical parameters. Although the circuit matrix structure does not change, the values of certain matrix components may be affected by the variation of the statistical parameters. In conventional simulators, there are two major portions of time spent on circuit simulation. First, the circuit matrix is largely sparse, but the simulator still spends lots of time to restructure every part of the matrix. This process is referred to as stamping, which may cost as high as 70% of the solving time. According to embodiments of the present disclosure, after the first pass simulation of the circuit, information pertaining to which portions of the circuit matrix need to be modified and which portions of the circuit matrix remain the same is provided to the solver, thus, the solver can be simplified to perform partial stamping and solving, instead of full LU solve, which lead to significant improvement in simulation efficiency.

With this approach, only a small portion of the circuit is resolved while the rest of the circuit may remain intact. As a result, the caching of the simulation data by processors associated with computing portions of a circuit matrix can be more efficient, and parallel solving may be scalable to number of processors (CPUs/GPUs). In other words, the circuit simulator may be configured to better use multiple processors to conduct the simulation in parallel in order to gain efficiency.

There are a number of ways to utilize the parallelism and task mapping capabilities of the processor. For small matrices, one way is to directly load the whole matrix into the processor, and split the job inside processor for parallel processing. Another way is to split the matrix into block matrices, which can be processed in parallel. And then move those block matrices into processor, do the solving in parallel. In this section, one method of split matrix into block matrices is given as an example.

For large matrices, to improve the level of parallel processing, a large matrix may be split into many smaller matrices (also referred to as block matrices). Then the smaller matrices are loaded in the processor, and the smaller matrices are solved in parallel. After the smaller matrices have been solved, the results are combined and stored as the results for the large matrix. With this approach, one way to achieve parallel processing is to assign a block of threads to handle one smaller matrix to be executed in a multiprocessor. Furthermore, within one block of threads, the smaller matrix may be solved in parallel using data structures and methods described in the following sections. According to embodiments of the present disclosure, a large matrix may be split into smaller matrices using the method described below. First, by changing the ordering of the rows/columns, the large matrix may be expressed in a form shown in equation 1, and then equation 1 may be further converted to equation 2.

$$\begin{bmatrix} A_1 & & & B_1 \\ & A_2 & & B_2 \\ & & A_3 & B_3 \\ C_1 & C_2 & C_3 & D \end{bmatrix} \begin{bmatrix} x_1 \\ x_2 \\ x_3 \\ x_D \end{bmatrix} = \begin{bmatrix} b_1 \\ b_2 \\ b_3 \\ b_D \end{bmatrix} \quad \text{(eq. 1)}$$

$$\begin{bmatrix} A_1 & & & B_1 \\ & A_2 & & B_2 \\ & & A_3 & B_3 \\ 0 & 0 & 0 & D - \sum_{i=1}^{3} C_i A_i^{-1} B_i \end{bmatrix} \begin{bmatrix} x_1 \\ x_2 \\ x_3 \\ x_D \end{bmatrix} = \begin{bmatrix} b_1 \\ b_2 \\ b_3 \\ b_D - \sum_{i=1}^{3} C_i A_i^{-1} b_i \end{bmatrix} \quad \text{(eq. 2)}$$

From equation 2, the block matrices can be solved in a bottom-up manner on a block-by-block basis. In this example, the scheme may split the large matrix into 3 smaller matrices, namely A1, A2 and A3. And the processing of these smaller matrices may be done in parallel.

By applying the same technique, each smaller matrix (block matrix) may be split it into another group of block matrices. As a result, a hierarchical arrangement of multiple levels of block matrices may be formed. For example, a root block matrix represents the large matrix. At each level, a block may represent a block matrix derived from the root block matrix. Through this arrangement, since the block matrices at each level are independent of one another, they may be solved in parallel using the processor and its associated processors and blocks of threads.

In conventional simulators, one of the problems is that when a processor is assigned a task, after performing the task, it no longer retains information of that task, as it moves on to handle a new task, information about the previous task is lost. This is referred to as "data cache missing", that is the states of the previous block of a circuit matrix are no longer available when the processor is solving the next block, because the conventional simulator has flushed the previous state out of its cache memory. As a result, the processor spends time in flushing its cache, and also spends time in setting up its cache memory for computing the next block. On the other hand, the approach of the present disclosure may be configured to use multiple processors for simulation because only a small portion of the circuit has been changed; majority of circuit may be cached in the memory during simulation. This can lead to orders of magnitudes of improvement in simulation efficiency. For example, if the solver is ten times faster and the parallelism is twenty times faster, the combined improvement is two hundred times faster because the two improvements are orthogonal to one another.

According to embodiments of the present disclosure, the disclosed time step control logic may reduce the total number of iterations per time step by using the history of previous simulations to guide the selection of time steps. As shown in FIG. 3, the simulator loops to determine the best time step to use, sometimes it may even have to change algorithm in between iterations. Typically, the number of time steps is directly related the amount of time spent in simulation, for example, if the number of time steps can be reduced to half, the typically simulation time may also be reduced to half.

Figure 4:
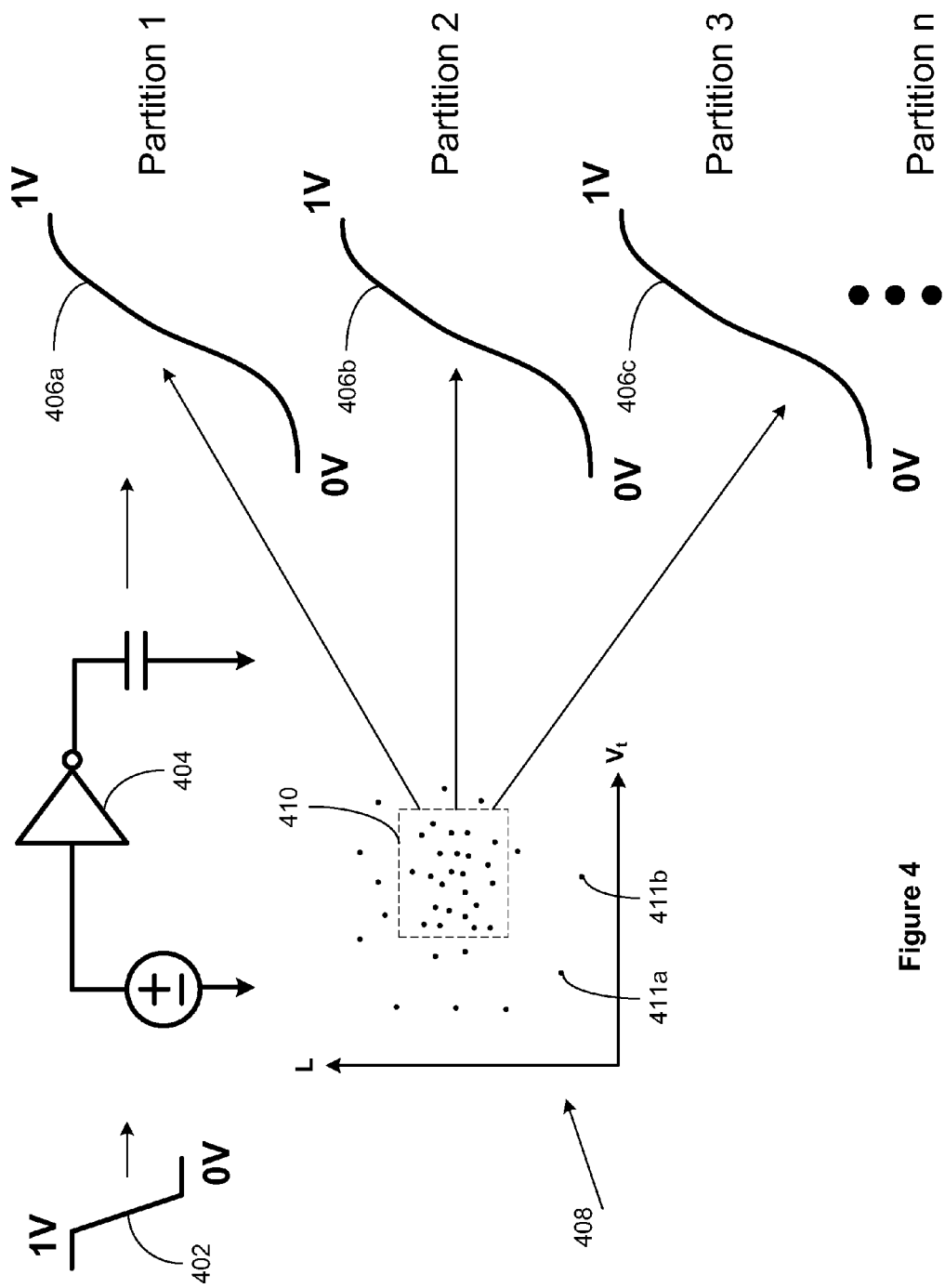
FIG. 4 illustrates a method of using simulation results of one circuit partition to simulate other circuit partitions according to embodiments of the present disclosure.

FIG. 4 illustrates a method of using simulation results of one circuit partition to simulate other circuit partitions according to embodiments of the present disclosure. As shown in FIG. 4, the exemplary circuit being simulated is an inverter 402, which takes an input 404 that transitions from high to low, and produces an output 406a that transitions from low to high. The method employed takes the benefit of the fact that statistical analyses have the nature of not changing the circuit topology, nor changing the stimuli between each seed of the simulation. Instead, only small number of model or instant parameters may be changed between different seeds. In many cases, the changes may be minor while the circuit simulation is able to converge to achieve a yield-performance trade-off analysis. In one approach, the selection of an optimized time step may be predicted from the past history of previous seeds as opposed to from the previous time steps. In gathering the pass history of previous seeds, for example via a first pass simulation of the circuit, correlations between the simulation output in response to variations of statistical parameters may be obtained and used to determine time steps for subsequent simulations.

Referring to FIG. 4, for simplicity of illustration, only threshold voltage (Vt) and channel length (L) of a transistor are shown as varying statistical parameters in this example. The horizontal axis represents the change in threshold voltage (Vt), and the vertical axis represents the change in channel length (L). Variations of statistical parameters with respect to one another are shown as scattered dots, such as 411aa and 411b, in this graph. According to embodiments of the present disclosure, the method identifies one or more clusters of statistical parameters represented by numeral 410. In some implementations, each cluster includes a group of statistical parameters where variations within the group may not change the outcome of a simulation. In some other implementations, each cluster includes a group of statistical parameters where variations within the group may only change the outcome of the simulation within a predetermined range, such as Vout (not shown) within +/−0.01V. For example, cluster 410 may represent a transistor model in one or the regions, such as the sub-threshold region, the linear region, and the saturation region.

In the example shown in FIG. 4, the simulation may be repeated many times in typical statistical analyses. Since the inverters in each partition are the same but have different model parameters due to variations in manufacturing processing. During partitioning, the simulator can take parameters a close neighborhood of parameters such as cluster 410, where the deviation between the parameters is small. For each simulation, the results of the output graphs may be substantially similar, shown as 406a, 406b and 406c, with small variations between each output graph when simulating with statistical parameters chosen from the cluster 410. Once the results of the simulation output are known from the history of the previous simulation, such as 406a (representing an inverter of Partition 1), the simulator may reduce the number of time steps taken, for simulation of Partition 2 to Partition n, especially during certain period when there is no significant change in the simulation output as shown in 406a, 406b, and 406c.

In simulating for Partitions 2 to Partition n, the simulator can use information from the simulation of Partition 1 (406a) to get better estimate of time steps. For example, based on the information from simulation of Partition 1, if the simulator knows that the local truncation error is small, it may take a larger time step in the simulation of subsequent partitions. According to embodiments of the present disclosure, a relative error tolerance may be set by the user of the simulator. A default value may be set to be of the order of magnitude $10^{-3}$ of the output signal. For example, if the magnitude of an output voltage is 1V, the default relative error tolerance may be set to be 1 mV. In other applications, if the user wants to generate simulation results of higher accuracy, the relative error tolerance may be set to $10^{-4}$ of the output signal. On the other hand, if the user wants the simulation to run faster, the relative error tolerance may be set to $10^{-2}$ of the output signal. As a result, the simulator 204 may take fewer time steps as opposed to using a step-by-step approach with a small fixed time increment (hundreds of steps) and perform the solving at each time step.

Figure 5:
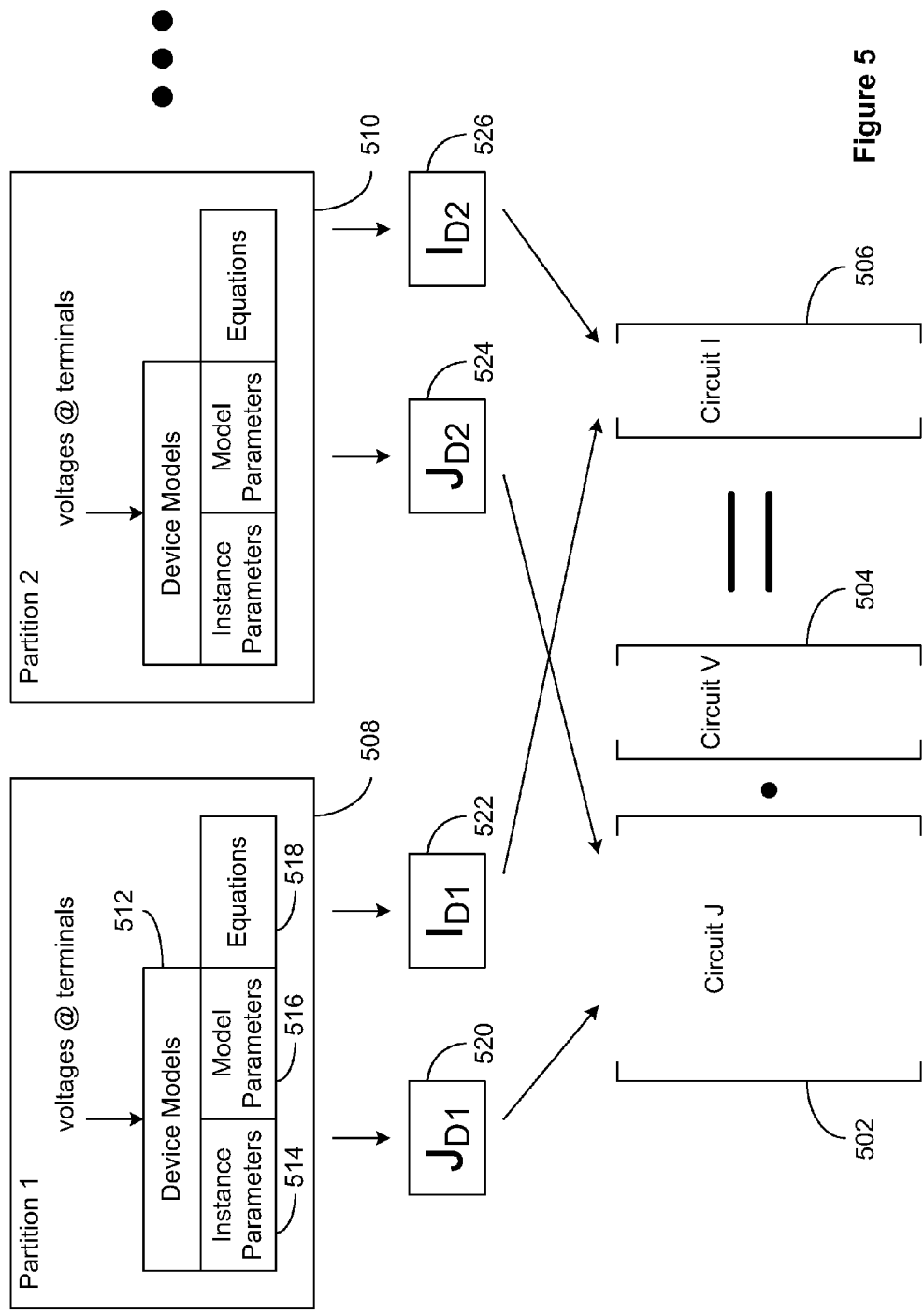
FIG. 5 illustrates another method of using simulation results of one circuit partition to simulate other circuit partitions according to embodiments of the present disclosure.

FIG. 5 illustrates another method of using simulation results of one circuit partition to simulate other circuit partitions according to embodiments of the present disclosure. In the example shown in FIG. 5, a matrix Circuit J 502 represents resistance (R) and capacitance (C) characteristics of the circuit under simulation, also referred to as the Jacobian of the circuit. A matrix Circuit V 504 represents a voltage vector of the circuit under simulation, where each component of Circuit V 504 represents a node voltage of the circuit. A matrix Circuit I 506 represents an integrated charge vector (also referred to as the right hand side of the solution) of the circuit under simulation, where each component of Circuit I 506 represents an integrated charge at a node of the circuit. A product of the Jacobian with the voltage vector of a circuit partition can be expressed as a function of device models, device parameters, and node voltages. Through the process of LU decomposition, a Jacobian of a circuit partition can be expressed as a product of L and U matrices of the circuit partition.

Note that the LU decomposition, also referred to as LU factorization, is a matrix decomposition which writes a matrix as the product of a lower triangular matrix and an upper triangular matrix. This decomposition is used in numerical analysis to solve systems of linear equations or calculate the determinant of a matrix. For example, Let A be a square matrix. An LU decomposition is a decomposition of the form A=LU, where L and U are lower and upper triangular matrices (of the same size), respectively. This means that L has only zeros above the diagonal and U has only zeros below the diagonal. For a 3×3 matrix, this becomes:

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} l_{11} & 0 & 0 \\ l_{21} & l_{22} & 0 \\ l_{31} & l_{32} & l_{33} \end{bmatrix} \begin{bmatrix} u_{11} & u_{12} & u_{13} \\ 0 & u_{22} & u_{23} \\ 0 & 0 & u_{33} \end{bmatrix}.$$

According to embodiments of the present disclosure, given resistance and capacitance characteristics and the node voltages of the circuit, the simulator solves for the integrated charge at each node of the circuit with the following expressions, where J represents the Jacobian of a circuit partition, V represents the voltage vector of a circuit partition, and I represents the integrated charge of a circuit partition:

$$J_1 * V_1 = L_{J1} * U_{J1} * V_1 = I_1; \quad \text{For Partition 1:}$$

Since partitions of the circuit and the node voltages are substantially the same, it follows that in subsequent simulation of Partition 2 to Partition n, the Jacobian of Partition 1, represented by $J_1$, and its corresponding factored LU matrices, represented by $L_{J1}$ and $U_{J1}$ can be reused in simulation as shown below:

$$J_2 * V_2 = L_{J1} * U_{J1} * V_2 = I_2; \quad \text{For Partition 2:}$$

$$J_3 * V_3 = L_{J1} * U_{J1} * V_3 = I_3; \quad \text{For Partition 3:}$$

$$\ldots$$

$$J_n * V_n = L_{J1} * U_{J1} * V_n = I_n. \quad \text{For Partition n:}$$

Note that in solving the above equations, a residue is maintained to record the error associated with solving each equation. If the residue is smaller than a predetermined error control value, for example $10^{-4}$ or $10^{-5}$ of the output signal, then the simulator can continue to reuse the Jacobian obtained from the simulation history of Partition 1. On the other hand, if the residue is larger than the predetermined error control value, the simulator can stop reusing the Jacobian from the simulation history of Partition 1.

There are numerous benefits associated with the method described above. First, the method can reuse the $L_{J1}$ and $U_{J1}$ in the simulation of subsequent circuit partitions. This saves significant computing resources in factoring the Jacobian into L and U matrices for each circuit partition. In addition, the above method can reuse the model R and C evaluations, i.e. saves calculations of partial derivatives of (R, C). Furthermore, the method saves the need to load the Jacobian matrix in simulation of each subsequent circuit partitions.

Referring to FIG. 5, for simplicity of illustration, only Partition 1 508 and Partition 2 510 are shown. Multiple circuit partitions may have the same circuit characteristics and node voltages (also referred to as voltages at terminals), and these partitions may be computed with a global Jacobian matrix Circuit J 502, a global node voltage vector matrix Circuit V 504, and a global integrated charge vector matrix Circuit I 506. Each circuit partition includes device models 512, which further includes instance parameters 514 and model parameters 516. The circuit partition further includes equations 518. For each partition, the simulator takes node voltages (also referred to as voltages at terminals) as inputs, and produces its corresponding Jacobian matrix and integrated charge vector, for example sub-matrices $J_{D1}$ 520 and $I_{D1}$ 522 for Partition 1 and sub-matrices $J_{D2}$ 524 and $I_{D2}$ 526 for Partition 2, and etc. The Jacobian matrix, for example $J_{D1}$ 520 and $J_{D2}$ 524, from each of the partition may be stamped into the global Jacobian matrix Circuit J 502. Similarly, the integrated charge vector matrix, for example $I_{D1}$ 522 and $I_{D2}$ 526, from each of the partition may be stamped into the global integrated charge vector matrix Circuit I 506. For device model evaluation applications, because the circuit partitions and their corresponding node voltages are substantially the same, $J_{D1}$ may be used for $J_{D2}, J_{D3}, \ldots$ and $J_{Dn}$; and $I_{D1}$ may be used for $I_{D2}, I_{D3}, \ldots$ and $I_{Dn}$. As a result, computing resources can be saved when the Jacobian matrices and the integrated charge vector can be shared among the partitions.

Note that during a simulation (typically the first pass simulation) in addition to caching the history of the simulation, the simulator also performs regression to determine correlations between simulation output and variations of statistical parameters. For example, if certain input parameters do not have strong correlation with the output, these input parameters may be ignored in subsequent simulations. On the other hand, if certain input parameters have strong correlation with the output; these input parameters will be used and monitored closely in subsequent simulations. With this approach, the simulator gains knowledge of the correlations information, it may simplify the computations by skipping certain parameters that does not have an effect on the simulation output, and thus improves efficiencies of the subsequent simulations. Note that the disclosed approach improves simulation efficiency by reducing the number of simulation steps and reduces the number of computations performed, but there is no loss in accuracy of the simulation. Newton iterations are still performed by the simulator during each time step to ensure accuracy of the simulation.

In conventional approaches, a group of seed are selected, which includes a combination of values from the various input statistical parameters, and then each seed is simulated by the simulator in a random fashion, to find a converged solution using the Monte-Carlo analysis. For example, the ranges of various statistical parameters, such as threshold ($V_1$), oxide thickness ($T_{ox}$), and channel width of a transistor (W) are provided to a seed generation algorithm, and seeds are randomly generated to cover the ranges for each parameter. Then the randomly generated seeds are provided to the simulator for simulation. As a result, there is no communication between the seed generation algorithm and the simulator. As a result, in simulation, the conventional simulator treats each seed independently as if there is no relationship between the seeds because they have been generated randomly.

On the other hand, according to embodiments of the present disclosure, the seeds of the input statistical parameters may be sorted in a predetermined order chosen by the designer, for example in an ascending order or in an descending order, and the simulation may be carried out using the sorted seeds. One of the benefits is that the simulator may treat small changes and large changes in simulation output separately. For example if a simulation output has a large deviation from its previous trend, the simulation output may need to be analyzed to determine whether a new trend has emerged or there are problems with the circuit design. Using the sorted seeds in simulation, the simulator may be configured to track any changes of trend in the simulation output. If a change of trend is detected, the simulator may adjust its methodologies to follow the new trend, and timely capture and track the changes accordingly. Note that the simulator does not spend additional time to provide this capability. The simulator still simulates the same number of seeds using the sorted seeds. The difference is the order of seeds being simulated is based on the outcome of the sorting.

With conventional simulators, such change of trends cannot be detected as simulation is done with randomly generated seeds. In conventional simulation methodologies, the simulator (tool that performs computation/simulation) and the analysis (designer/tool who analyze the design) are separated from each other, as they are typically performed by different companies, EDA tool companies and circuit design companies. In that approach, how the seeds are selected and used have no impact on how the simulations are done, and vice versa. To the circuit design companies, the simulator is merely a tool that does computations with whatever the seeds that are provided to it.

To detect a change of output trend, the simulator is provided with the information that the seeds have been sorted, and periodically checks whether the there is a large variation in the output (e.g. a change of 0.5% versus 5%). In one example, if the statistical parameter threshold voltage of a transistor is provided to the simulator in a sorted manner, the simulator can use such information to detect a change of trend in the simulation output. In this case, if the deviation of the simulation output is over certain predetermined limit, for example 1%, the simulator may perform a detailed time step analysis and a new time step may be generated to address the new range of outputs. As a result, simulation efficiency can be improved by comparing simulation outputs of the current seed with that of the previous seeds to make an informed prediction based on the history of the previous simulation.

According to embodiments of the present disclosure, the simulator (parser and elaborator of the simulator) may use information about variations of the statistical parameters to create circuit partitions for simulation. In other words, partition-based partial pausing and elaboration can take into account not only the topology and electrical activity of the circuit, but also the variations of statistical parameters in determining more efficient circuit partitions and circuit matrices for simulation.

In one approach, the simulator may be configured to efficiently simulate a previously simulated circuit with certain localized modifications, for example simulating for mismatch of a pair of transistors, components, or even circuit blocks. Note that in this situation, only the parameters of a small number of transistors of the entire circuit have been changed while the rest of the circuit remains the same. The simulator has information of the parameters that have been changed and the locations of the transistors being affected by the change. This is referred to as a localized variation. For example, given a current mirror, although the transistors may be designed with the same size, in practice, due to process variations, the transistor may have different sizes. To simulation such process variations, a small variation is added to one of the transistors in the current mirror over a period of time to examine the impact of this small variation to the outcome of the simulation. This approach can benefit mismatch simulations commonly performed in practice.

In another approach, the simulator may be configured to efficiently simulate a previously simulated circuit with certain globalized modifications, for example simulating a change in threshold voltage or gate oxide thickness that affects all instances in the circuit. In this scenario, there is no change to the topology of the circuit, and there is no change to the stimuli of the circuit. This is referred to as a global variation. The parsing and partition are affected due to the change in the input statistical parameters, which conventional simulators would not take such changes into consideration in their parsing and circuit partition. Thus, the disclosed parsing and partitions can generate more accuracy and efficient circuit partitions and circuit matrices using such information of the global variations in the statistical parameters.

There are numerous benefits with the disclosed methods for repetitive circuit simulation. For example, in simulating a circuit having a repetitive input signal, such as a Sine wave, there are many signals in the circuits that are repetitive. In this type of applications, the simulator simulates many cycles of the repetitive waveforms and analyzes the repetitive properties of the circuit, for example performing FFT (Fast Fourier Transform) simulation to examine the spectrum of the output. Conventional simulators would consume a long time for doing this simulation. In addition, the accuracy requirement for this type of applications is very high. The reason is that there is a need to reduce the numerical noise of the simulator as well as the computer that runs the simulation. This means that the simulation needs to be performed with the maximum accuracy. To ensure accuracy, conventional simulators would normally use smaller time steps, and apply tighter tolerance on the statistical parameters and simulation outputs, which again prolongs simulation time. With the methods described in the present disclosure, the number of time steps and the number of computations (solves) may be significantly reduced, which in turn can lead to significant reduction in simulation time for this type of applications.

Another benefit of the disclosed methods is that they can be applied to simulate analog to digital (A2D) or digital to analog (D2A) conversions. In order to determine the accuracy of A2D or D2A conversions, up to 20 bits of accuracy may be required. Merely performing a transient analysis may not be sufficient for this type of applications. In other words, designers can no longer determine the accuracy from examining one waveform. Instead, thousands of repetitive simulations need to be performed on the same circuit to distinguish the background noise from the true circuit noise. To solve this problem, FFT analyses with thousands of repetitive simulations are performed to distinguish the digital (numerical) noise of the computer as well as the noise from the simulator tool, from the true circuit noise from the circuit design. Again, with the methods described in the present disclosure, the number of time steps and the number of computations (solves) may be significantly reduced, which in turn can lead to significant improvement in simulation efficiency for this type of applications.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The system and method described above can be implemented in any suitable form, including hardware, software, firmware, or any combination of these. The system and method may optionally be implemented partly as computer software running on one or more data processors and/or digital signal processors. The elements and components of an embodiment of the system and method may be physically, functionally, and logically implemented in any suitable way. Indeed, the functionality may be implemented in a single unit, in a plurality of units, or as part of other functional units. As such, the system and method may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A computer implemented method for performing multiple simulations of a circuit, comprising:
   providing descriptions of connectivity, instants, signal activities, and statistical parameters of the circuit, wherein the descriptions of statistical parameters include variations related to transistor model and variations related to circuit instance;
parsing the circuit in accordance with the descriptions of connectivity, instants, signal activities, and statistical parameters of the circuit to form one or more circuit partitions;
performing a first pass simulation of the one or more circuit partitions for a period of time in accordance with a set of stimuli to generate a history of the first pass simulation; and
performing subsequent simulation of the one or more circuit partitions using the history of the first pass simulation, wherein performing subsequent simulation of the one or more circuit partitions comprises selecting simulation time steps based on information of the statistical parameters and the history of the first pass simulation; and simulating the one or more circuit partitions using the simulation time steps, and wherein performing subsequent simulation of the one or more circuit partitions further comprises:
generating seeds that includes random combinations of values of the statistical parameters;
sorting the seeds according to predetermined order of changes of one or more statistical parameters;
simulating the circuit using the one or more circuit partitions and the seeds being sorted for simulation;
detecting deviations of simulation output using the predetermined order of changes of one or more statistical parameters of the statistical parameters of the circuit; and
adapting simulation to the deviations of simulation output.

2. The computer implemented method of claim 1 further comprises:
storing the history of the first pass simulation in cache memory of one or more processors, wherein the history of the first pass simulation includes the descriptions of connectivity, instants, signal activities, and statistical parameters, and corresponding simulation outputs of the circuit during a period of the first pass simulation.

3. The computer implemented method of claim 1, wherein the period of time comprises at least one of a single time step, multiple time steps, or an entire simulation time window.

4. The computer implemented method of claim 1, further comprises:
identifying correlations between the statistical parameters and simulation output of the circuit; and
performing subsequent simulation of the one or more circuit partitions using the correlations between the statistical parameters and simulation output of the circuit.

5. The computer implemented method of claim 4, wherein identifying correlations between the statistical parameters and simulation output of the circuit comprises:
identifying correlations between Jacobian matrices of the one or more circuit partitions;
identifying correlations between factorized LU matrices of the one or more circuit partitions; and
identifying correlations between integrated circuit vector matrices of the one or more circuit partitions.

6. The computer implemented method of claim 1, further comprises:
modifying a subset of instances of the circuit;
stamping circuit matrices associated with changes due to the subset of instances; and
simulating the circuit using the one or more circuit partitions and the history of the first pass simulation.

7. The computer implemented method of claim 1, further comprises:
modifying one or more statistical parameters of an instance of the circuit; and
simulating the circuit using the one or more circuit partitions and the history of the first pass simulation.

8. A computer program product for modeling dynamic behavior of a transistor, comprising a non-transitory medium storing computer programs for execution by one or more computer systems, the computer program product comprising:
code for providing descriptions of connectivity, instants, signal activities, and statistical parameters of a circuit, wherein the descriptions of statistical parameters include variations related to transistor model and variations related to circuit instance;
code for parsing the circuit in accordance with the descriptions of connectivity, instants, signal activities, and statistical parameters of the circuit to form one or more circuit partitions;
code for performing a first pass simulation of the one or more circuit partitions for a period of time in accordance with a set of stimuli to generate a history of the first pass simulation; and
code for performing subsequent simulation of the one or more circuit partitions using the history of the first pass simulation, wherein code for performing subsequent simulation of the one or more circuit partitions comprises code for selecting simulation time steps based on information of the statistical parameters and the history of the first pass simulation; and code for simulating the one or more circuit partitions using the simulation time steps, and wherein the code for performing subsequent simulation of the one or more circuit partitions further comprises:
code for generating seeds that includes random combinations of values of the statistical parameters;
code for sorting the seeds according to predetermined order of changes of one or more statistical parameters;
code for simulating the circuit using the one or more circuit partitions and the seeds being sorted for simulation;
code for detecting deviations of simulation output using the predetermined order of changes of one or more statistical parameters of the statistical parameters of the circuit; and
code for adapting simulation to the deviations of simulation output.

9. The computer program product of claim 8 further comprises:
code for storing the history of the first pass simulation in cache memory of one or more processors, wherein the history of the first pass simulation includes the descriptions of connectivity, instants, signal activities, and statistical parameters, and corresponding simulation outputs of the circuit during a period of the first pass simulation.

10. The computer program product of claim 8, wherein the period of time comprises at least one of a single time step, multiple time steps, or an entire simulation time window.

11. A system for performing multiple simulations of a circuit, comprising:
at least one processing unit for executing computer programs;
a memory for storing information of the circuit;
a repetitive circuit simulator module, wherein the repetitive circuit simulator module includes logic for providing descriptions of connectivity, instants, signal activities, and statistical parameters of the circuit, wherein the descriptions of statistical parameters include variations related to transistor model and variations related to circuit instance;

logic for parsing the circuit in accordance with the descriptions of connectivity, instants, signal activities, and statistical parameters of the circuit to form one or more circuit partitions;

logic for performing a first pass simulation of the one or more circuit partitions for a period of time in accordance with a set of stimuli to generate a history of the first pass simulation; and logic for performing subsequent simulation of the one or more circuit partitions using the history of the first pass simulation, wherein logic for performing subsequent simulation of the one or more circuit partitions comprises logic for selecting simulation time steps based on information of the statistical parameters and the history of the first pass simulation; and logic for simulating the one or more circuit partitions using the simulation time steps, and wherein logic for performing subsequent simulation of the one or more circuit partitions further comprises:

logic for generating seeds that includes random combinations of values of the statistical parameters;

logic for sorting the seeds according to predetermined order of changes of one or more statistical parameters;

logic for simulating the circuit using the one or more circuit partitions and the seeds being sorted for simulation;

logic for detecting deviations of simulation output using the predetermined order of changes of one or more statistical parameters of the statistical parameters of the circuit; and logic for adapting simulation to the deviations of simulation output.

12. The system of claim 11 further comprises:

logic for storing the history of the first pass simulation in cache memory of one or more processors, wherein the history of the first pass simulation includes the descriptions of connectivity, instants, signal activities, and statistical parameters, and corresponding simulation outputs of the circuit during a period of the first pass simulation.

13. The system of claim 11, wherein the period of time comprises at least one of a single time step, multiple time steps, or an entire simulation time window.

14. The system of claim 11, further comprises:

logic for identifying correlations between the statistical parameters and simulation output of the circuit; and logic for performing subsequent simulation of the one or more circuit partitions using the correlations between the statistical parameters and simulation output of the circuit.

15. The system of claim 14, wherein logic for identifying correlations between the statistical parameters and simulation output of the circuit comprises:

logic for identifying correlations between Jacobian matrices of the one or more circuit partitions;

logic for identifying correlations between factorized LU matrices of the one or more circuit partitions; and logic for identifying correlations between integrated circuit vector matrices of the one or more circuit partitions.

16. The system of claim 11, further comprises:

logic for modifying a subset of instances of the circuit;

logic for stamping circuit matrices associated with changes due to the subset of instances; and logic for simulating the circuit using the one or more circuit partitions and the history of the first pass simulation.

17. The system of claim 11, further comprises:

logic for modifying one or more statistical parameters of an instance of the circuit; and logic for simulating the circuit using the one or more circuit partitions and the history of the first pass simulation.

* * * * *